(12) United States Patent
Azzouz et al.

(10) Patent No.: US 6,609,748 B1
(45) Date of Patent: Aug. 26, 2003

(54) FORWARD FACING REAR DOOR ASSEMBLY FOR MOTOR VEHICLES

(75) Inventors: Musa Azzouz, Northville, MI (US); Michael David Pevovar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/669,423

(22) Filed: Sep. 25, 2000

(51) Int. Cl.$^7$ .................................................. B60J 5/00
(52) U.S. Cl. ................. 296/146.1; 296/146.5; 296/202; 296/146.11
(58) Field of Search ........................ 296/146.1, 146.5, 296/146.6, 146.9, 146.11, 146.12, 183, 190.11, 202, 204; 49/366

(56) References Cited

U.S. PATENT DOCUMENTS

| | | | | |
|---|---|---|---|---|
| 1,634,656 A | * | 7/1927 | Fatoux | 296/202 X |
| 1,639,037 A | * | 8/1927 | Hollingshead | 296/202 X |
| 1,676,599 A | * | 7/1928 | Breneman | 296/202 |
| 1,869,274 A | * | 7/1932 | Phillips | 49/365 |
| 1,961,205 A | * | 10/1932 | De Viscaya | 296/146.11 X |
| 1,951,863 A | * | 9/1934 | De Viscaya | 296/146.1 |
| D146,206 S | * | 6/1937 | Anreau | 296/146.5 |
| 2,084,600 A | * | 6/1937 | Sparkman | 296/146.11 X |
| 2,827,321 A | * | 5/1958 | Leslie et al. | 292/5 |
| 2,937,043 A | * | 5/1960 | Griswold et al. | 296/149 X |
| 2,997,336 A | * | 8/1961 | Huggins et al. | 296/146.11 |
| 4,358,151 A | | 11/1982 | Wood | 296/146 |
| 4,719,665 A | * | 1/1988 | Bell | 296/146 X |
| 4,930,836 A | * | 6/1990 | Grinn | 296/146 |
| 4,973,103 A | | 11/1990 | Imajyo et al. | 296/195 |
| 5,297,841 A | * | 3/1994 | Siedlecki | 296/146.6 |
| 5,491,875 A | | 2/1996 | Siladke et al. | 16/346 |
| 5,551,197 A | | 9/1996 | Repp et al. | 52/204.62 |
| 5,663,520 A | * | 9/1997 | Ladika et al. | 296/204 X |
| 5,752,737 A | * | 5/1998 | Heldt et al. | 296/146.6 |
| 5,772,277 A | | 6/1998 | Fukuda | 296/201 |
| 6,053,561 A | | 4/2000 | Hojnowski et al. | 296/146.11 |
| 6,196,617 B1 | * | 3/2001 | Beck | 296/146.11 |
| 6,196,618 B1 | | 3/2001 | Pietryga et al. | 296/146.11 |

FOREIGN PATENT DOCUMENTS

| | | |
|---|---|---|
| DE | 3343013 A1 | 6/1985 |
| EP | 0 348 034 | 12/1989 |
| FR | 2 634 426 | 7/1988 |
| JP | 10-109662 | 4/1998 |

* cited by examiner

Primary Examiner—D. Glenn Dayoan
Assistant Examiner—Lori L Coletta
(74) Attorney, Agent, or Firm—Raymond L. Coppiellie

(57) ABSTRACT

A forward facing rear door assembly for a motor vehicle includes a forward facing rear door having a forward end and a rear end. The forward facing rear door assembly also includes a single hinge connected to the rear end of the forward facing rear door and for connection to a "C" pillar of a vehicle body to allow a forward end of the rear door to open and close a door opening in the vehicle body.

19 Claims, 4 Drawing Sheets

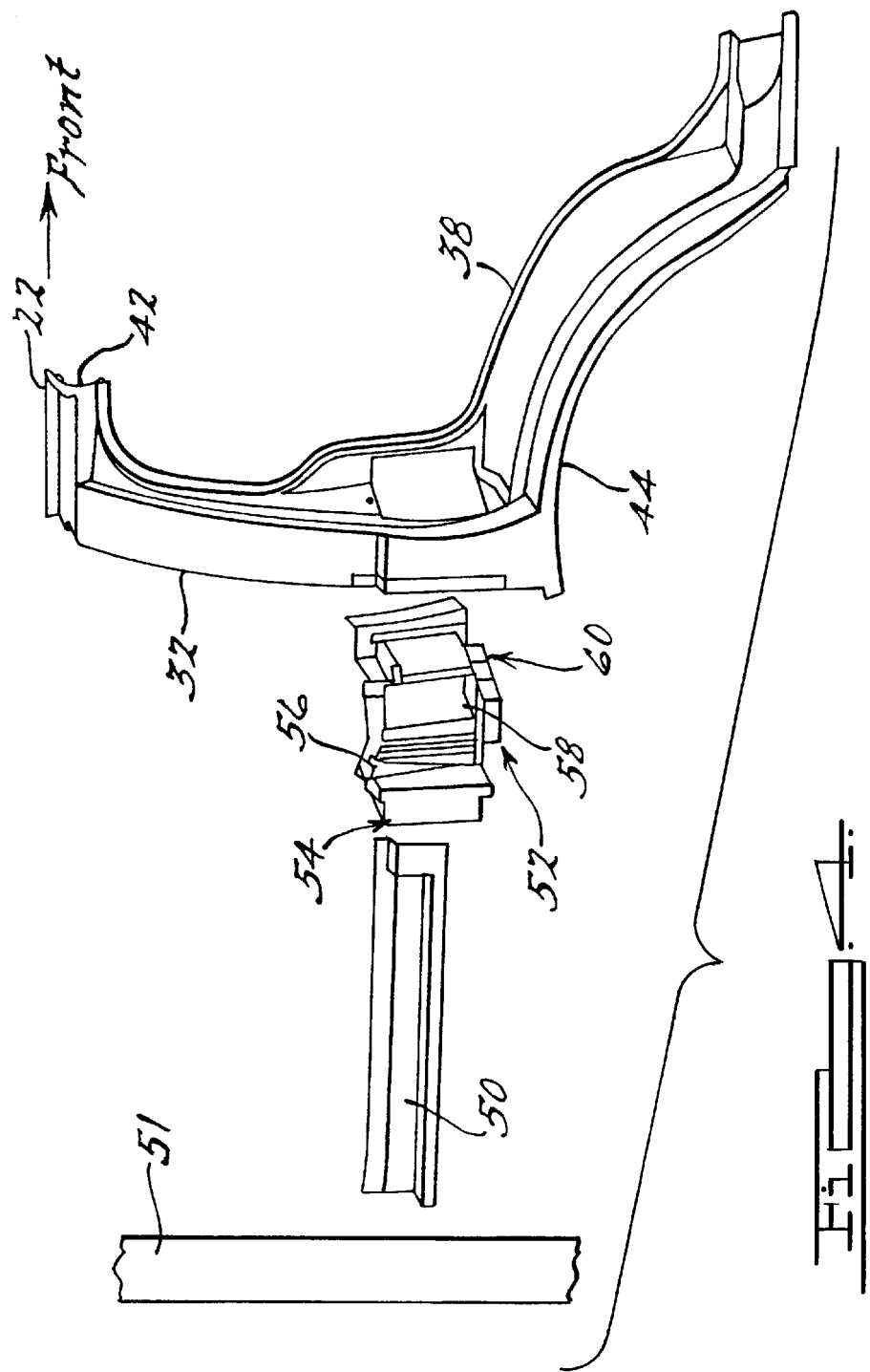

FORWARD FACING REAR DOOR ASSEMBLY FOR MOTOR VEHICLES

BACKGROUND OF THE INVENTION

1. Field of the Invention

The present invention relates generally to doors for motor vehicles and, more specifically, to a forward facing rear door assembly for a motor vehicle.

2. Description of the Related Art

It is known to provide a rear door for a motor vehicle. Typically, the rear door faces rearward and is attached to a body of the motor vehicle. The rear door hinges at the "B" pillar of the vehicle body by a pair of upper and lower hinges, and latches at the "C" pillar using a striker attached to the vehicle body.

It is desirable to provide a third door on at least one side of the motor vehicle to aid in the entry to a third row seat inside the motor vehicle. It is also desirable to provide a forward facing rear door for a motor vehicle. It is further desirable to provide a rear door hinging at the "C" pillar of the vehicle body of a motor vehicle. Therefore, there is a need in the art to provide a rear door assembly that meets these desires, and a body side structure that supports the door sag requirements and maintains the body stiffness equal to the baseline.

SUMMARY OF THE INVENTION

Accordingly, the present invention is a forward facing rear door assembly for a motor vehicle. The forward facing rear door assembly includes a forward facing rear door having a forward end and a rear end. The forward facing rear door assembly also includes a single hinge connected to a rear end of the forward facing rear door and for connection to a "C" pillar of a vehicle body of the motor vehicle to allow a forward end of the forward facing rear door to open and close a door opening in the vehicle body.

One advantage of the present invention is that a forward facing rear door assembly is provided for a motor vehicle. Another advantage of the present invention is that the body side structure has a unique box-like configuration that provides support for a forward facing rear door. Yet another advantage of the present invention is that the body side structure supports the forward facing rear door with a single hinge that is hidden and attached to a "C" pillar of a body of the motor vehicle. Still another advantage of the present invention is that the body side structure provides a unique load path within a side of a vehicle body that permits the forward facing rear door to meet system design requirements in drop-off, sag, and frame/seal performance. A further advantage of the present invention is that the body side structure allows a new six-door vehicle body to have bending/torsion stiffness, and bending/torsion modal frequencies that are almost equivalent to a conventional four-door vehicle body.

Other features and advantages of the present invention will be readily appreciated, as the same becomes better understood, after reading the subsequent description when considered in connection with the accompanying drawings.

BRIEF DESCRIPTION OF THE DRAWINGS

FIG. 4 is an exploded perspective view of the body structure of the forward facing rear door assembly of FIG. 1.

DESCRIPTION OF THE PREFERRED EMBODIMENT(S)

Figure 1:
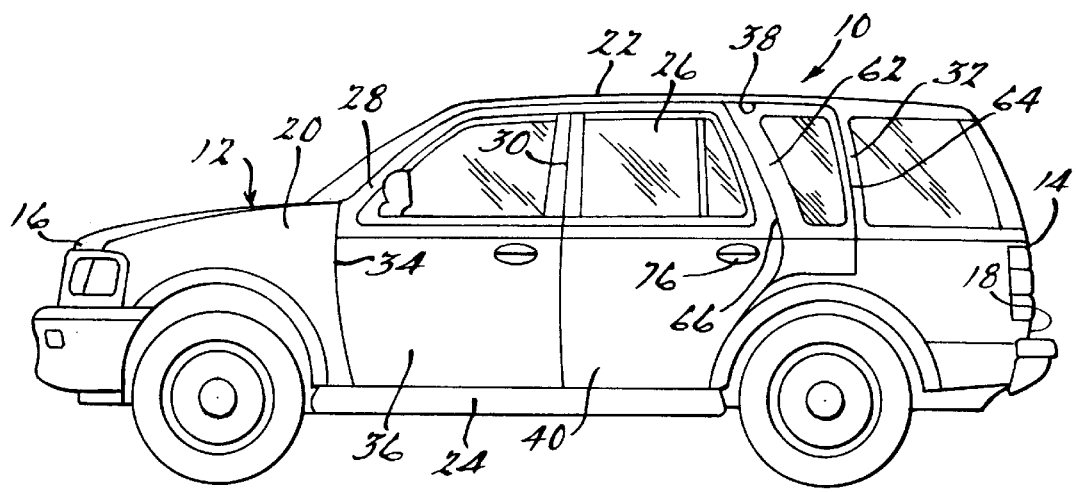
FIG. 1 is an elevational view of a forward facing rear door assembly, according to the present invention, illustrated in operational relationship with a motor vehicle.
Figure 3:
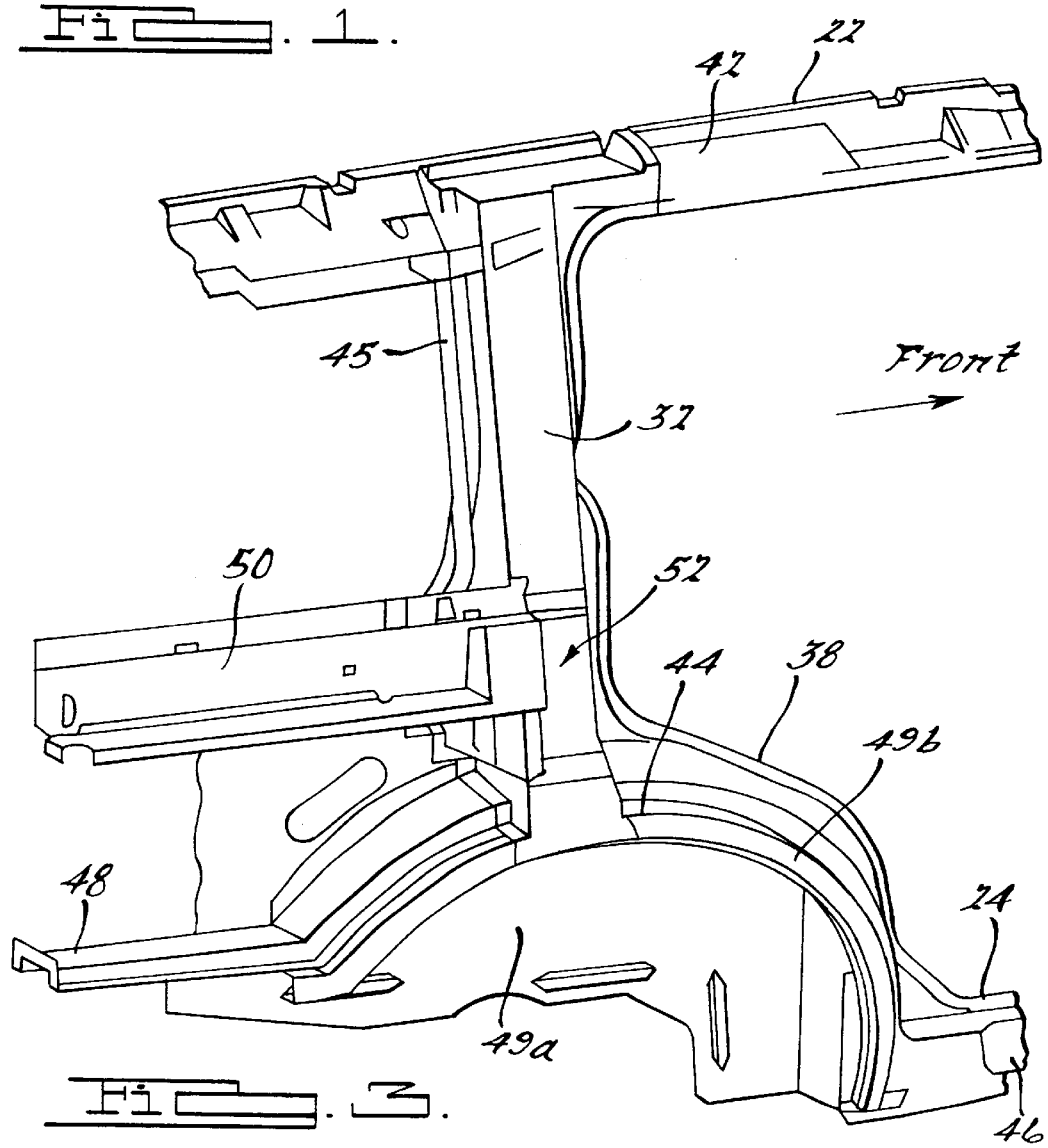
FIG. 3 is an elevational view of a body structure for the forward facing rear door assembly of FIG. 1.

Referring to the drawings and in particular FIG. 1, one embodiment of a forward facing rear door assembly 10, according to the present invention, is shown for a motor vehicle, generally indicated at 12. The motor vehicle 12 includes a vehicle body 14 having a forward end 16, a rear end 18 and a pair of sides 20 spaced laterally and extending longitudinally between the forward end 16 and the rear end 18. The vehicle body 14 also includes a roof 22 and a floor 24 attached to the sides 20 to form an occupant compartment 26 therein.

Figure 2:
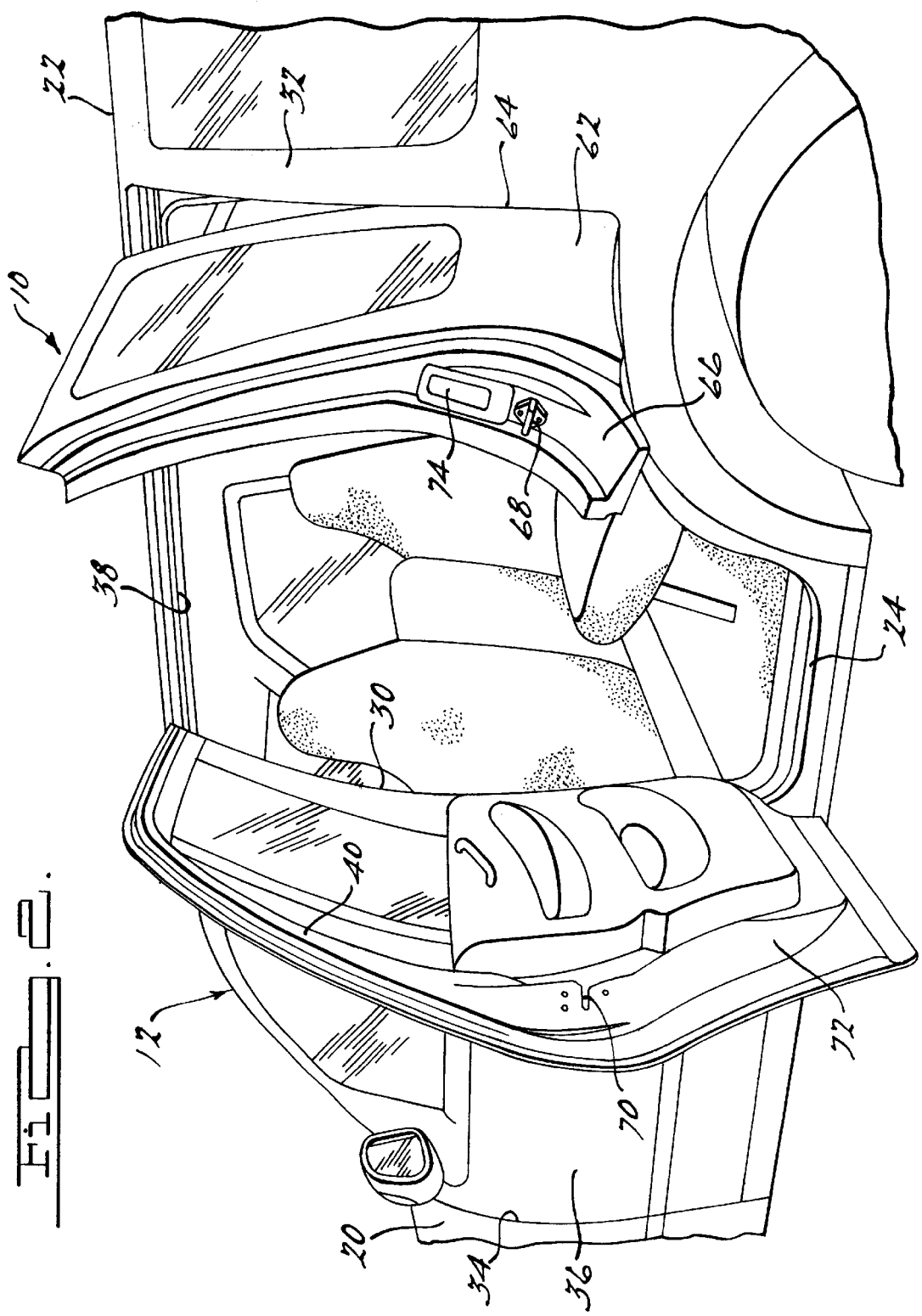
FIG. 2 is a perspective view of the forward facing rear door assembly of FIG. 1 illustrating rear doors in an open position.

Referring to FIGS. 1 and 2, at least one side 20 of the vehicle body 14 includes an "A" pillar 28, a "B" pillar 30, and a "C" pillar 32 spaced longitudinally and extending generally vertically between the roof 22 and the floor 24 of the vehicle body 14. The motor vehicle 12 includes a front door opening 34 in the side 20 of the vehicle body 14 disposed longitudinally between the pillars 28 and 30 and vertically between the roof 22 and the floor 24. The motor vehicle 12 also includes a front door 36 disposed in and closing the front door opening 34. The front door 36 faces rearward or toward the rear end 18 of the vehicle body 14 and is attached at its forward end to the A pillar 28 by suitable means such as upper and lower hinges (not shown). It should be appreciated that the front door 36 is conventional and known in the art.

The motor vehicle 12 also includes a single rear door opening 38 in the side 20 of the vehicle body 14 disposed longitudinally between the pillars 30 and 32 and vertically between the roof 22 and the floor 24. The motor vehicle 12 also includes a first or rearward facing rear door 40 disposed in and closing a portion of the rear door opening 38. The rearward facing rear door 40 faces rearward or toward the rear end 18 of the vehicle body 14 and is attached at its forward end to the B pillar 30 by suitable means such as upper and lower hinges (not shown). It should be appreciated that the rearward facing rear door 40 is conventional and known in the art.

Referring to FIGS. 1 through 5B, the forward facing rear door assembly 10 includes the C pillar 32 connected at its upper end to a roof rail 42 of the roof 22 and at its lower end over a wheel housing 44. The C pillar 32 has a generally U shaped cross-section and is connected to a body side inner panel 45 of the side 20 by suitable means such as welding to form a box-like structure having a generally rectangular, preferably square, cross-sectional shape. The wheel housing 44 is generally arcuate in shape and has a forward end attached to a rocker panel 46 of the floor 22 and a rear end attached to a floor pan (not shown) of the floor 22 by suitable means such as welding. The wheel housing 44 has an inner panel 49a and an outer panel 49b. The C pillar 32 is also connected to the inner panel 49a of the wheel housing 44 by suitable means such as welding. The forward facing rear door assembly 10 may also include a rear reinforcement 48 connected to the C pillar 32 and wheel housing 44 and floor pan by suitable means such as welding.

The forward facing rear door assembly 10 also includes a reinforcement body side member 50 extending longitudinally and having a forward end attached to the C pillar 32 by suitable means such as welding and a rear end attached to D pillar 51 (FIG. 4) by suitable means such as welding. The forward facing rear door assembly 10 includes a hinge box 52 disposed within and connected to the C pillar 32 by suitable means such as welding. It should be appreciated that hinge strength is achieved within the hinge box 52.

The hinge box 52 includes a hinge bulkhead 54 disposed behind the C pillar 32 and attached thereto by suitable means such as welding. The hinge box 52 also includes hinge-tapping plate 56 connected to the hinge bulkhead 54 by suitable means such as fasteners (not shown). The hinge box 52 includes a single hinge 58 having one end connected to the hinge tapping plate 56 by the fasteners. The hinge box 52 also includes a hinge bracket 60 attached to the other end of the hinge 58 and to a forward facing rear door 62 to be described. It should be appreciated that the hinge 58 is hidden from view and opens one hundred eighty degrees (180°)

The forward facing rear door assembly 10 further includes a second or forward facing rear door 62 disposed in and closing a portion or remainder of the rear door opening 38. The forward facing rear door 54 faces forward or toward the front end 16 of the vehicle body 14. The forward facing rear door 62 has a rear end 64 adjacent the C pillar 32 and a forward end 66 adjacent a rear end of the rearward facing rear door 40. The rear end 64 of the forward facing rear door 62 is attached to the hinge bracket 60 by suitable means such as fasteners (not shown). The forward facing rear door assembly 10 further includes a striker or latch member 68 attached to the forward end 66 of the forward facing rear door 62 for engagement and disengagement with a latch 70 on a rear end 72 of the rearward facing rear door 40. It should be appreciated that the latch member 68 and latch 70 are conventional and known in the art. It should also be appreciated that the rearward facing rear door 40 and forward facing rear door 62 are joined together in a pillar less manner. It should further be appreciated that the forward facing rear door assembly 10 may include a handle 74 on the forward end 66 of the forward facing rear door 62 to actuate latches (not shown) on the forward facing rear door 62 which engage and disengage the roof rail 42 and the rocker panel 46 similar to that disclosed in U.S. Pat. No. 5,752,737 to Heldt et al., the disclosure of which is hereby incorporated by reference.

Figure 5A:
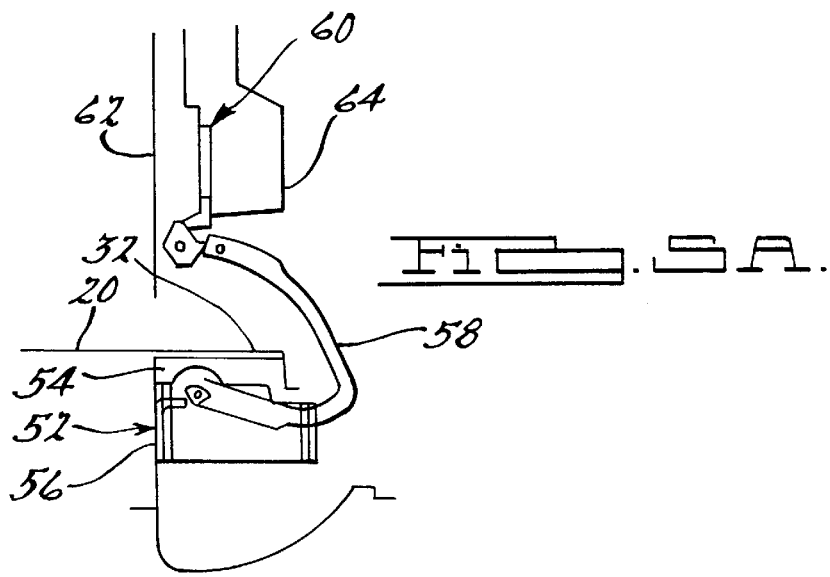
FIGS. 5A and 5B are sectional views of the forward facing rear door assembly of FIG. 1 illustrating a forward facing rear door in an open and closed position.
Figure 5B:
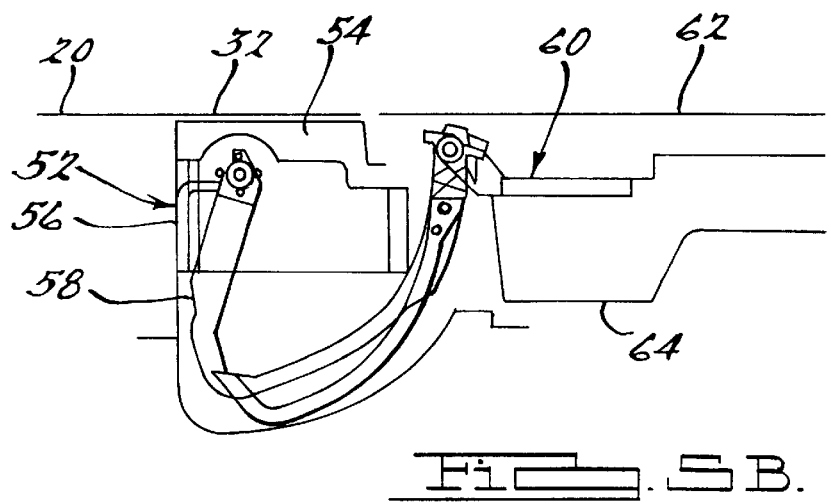

In operation, a handle 76 upon the rearward facing rear door 40 is actuated to release the latch 70 from the latch member 68 and the rearward facing rear door 40 is pivoted outwardly and forwardly as illustrated in FIG. 2. The handle 74 upon the forward facing rear door 54 is actuated to release latches (not shown) and the forward facing rear door 62 is pivoted outwardly and rearwardly as illustrated in FIGS. 2 and 5A. The hinge 58 opens 180° in two increments, first 90°, then by activating an auxiliary lever (not shown), it opens to a full 180°. The operation is reversed for closing the doors 40 and 62.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A forward facing rear door assembly for a motor vehicle comprising:
    a B pillar extending between a roof and a floor of a vehicle body;
    a rearward facing rear door having a rear end and a forward end pivotally connected to the B pillar to open and close a first portion of a door opening in the vehicle body;
    a C pillar having an upper end for connection to a roof rail of the vehicle body of the motor vehicle and a lower end for connection to a wheel housing of the vehicle body;
    a forward facing rear door having a forward end and a rear end; and
    a single hinge connected to said rear end of said forward facing rear door and connected to said C pillar to allow said forward facing rear door to open rearwardly up to one hundred eighty degrees.

2. A forward facing rear door assembly as set forth in claim 1 including a latch member on said forward end of said forward facing rear door for engagement and disengagement with a latch on said rearward facing rear door of the motor vehicle.

3. A forward facing rear door assembly as set forth in claim 1 including a hinge box adapted to be disposed behind the C pillar for connection thereto.

4. A forward facing rear door assembly as set forth in claim 3 wherein said hinge box includes a hinge bulkhead for connection to the C pillar.

5. A forward facing rear door assembly as set forth in claim 4 wherein said hinge box includes a hinge plate connected to said hinge bulkhead and one end of said hinge.

6. A forward facing rear door assembly as set forth in claim 5 wherein said hinge box includes a hinge bracket connected to another end of said hinge and said rear end of said forward facing rear door.

7. A forward facing rear door assembly as set forth in claim 1 including a body side reinforcement extending longitudinally for connection to the C pillar and a D pillar of the vehicle body.

8. A forward facing rear door assembly for closing a door opening in a side of a body of a motor vehicle comprising:
    a B pillar extending between a roof and a floor of the body of the motor vehicle;
    a C pillar extending between the roof and the floor to define the door opening in the body;
    a rearward facing rear door disposed in the door opening and pivotally connected to the B pillar for movement between an open position and a closed position;
    a forward facing rear door disposed in the door opening and pivotally connected to the C pillar for movement between an open position and a closed position;
    a rocker at a bottom portion of said door opening;
    a roof rail at a top portion of said door opening;
    a wheel housing connected to said rocker;
    said C pillar extending upwardly to said roof rail and downwardly to said wheel housing to form a box-like structure having a generally rectangular cross-sectional shape; and
    a single hinge connected to said rear end of said forward facing rear door and connected to said C pillar to allow said forward facing rear door to open rearwardly up to one hundred eighty degrees.

9. A forward facing rear door assembly as set forth in claim 8 wherein said C pillar has a generally U shaped cross-section.

10. A forward facing rear door assembly as set forth in claim 8 including a body side reinforcement extending longitudinally and connected to said C pillar and for connection to a D pillar of the vehicle body.

11. A forward facing rear door assembly as set forth in claim 8 wherein said forward facing rear door has a forward end and a rear end.

12. A forward facing rear door assembly as set forth in claim 11 including a hinge box adapted to be disposed behind the C pillar for connection thereto.

13. A forward facing rear door assembly as set forth in claim 12 wherein said hinge box includes a hinge plate connected to a hinge bulkhead.

14. A forward facing rear door assembly as set forth in claim 13 wherein said single hinge has one end connected to said hinge plate.

15. A forward facing rear door assembly as set forth in claim 14 wherein said hinge box includes a hinge bracket connected to another end of said hinge and said rear end of said forward facing rear door.

16. A forward facing rear door assembly as set forth in claim 8 including a latch member on a forward end of said forward facing rear door for engagement and disengagement with a latch on said rearward facing rear door of the motor vehicle.

17. A forward facing rear door assembly for closing a door opening in a side of a body of a motor vehicle comprising:

a B pillar extending between a roof and a floor of the body of the motor vehicle;

a C pillar extending between the roof and the floor to define the door opening in the body;

a rearward facing rear door pivotally connected to the B pillar between an open position and a closed position;

a forward facing rear door pivotally connected to the C pillar between an open position and a closed position;

a latch member on said forward facing rear door for engagement and disengagement with a latch on said rearward facing rear door;

a rocker at a bottom portion of said door opening;

a roof rail at a top portion of said door opening;

a wheel housing connected to said rocker;

said C pillar extending upwardly to said roof rail and downwardly to said wheel housing to form a box-like structure having a generally rectangular cross-sectional shape;

a body side reinforcement extending longitudinally and connected to said C pillar and for connection to a D pillar of the vehicle body;

a hinge box disposed within said C pillar and connected thereto; and a single hinge connected to a rear end of said forward facing rear door and said hinge box to allow said forward facing rear door to open rearwardly up to one hundred eighty degrees.

18. A forward facing rear door assembly as set forth in claim 17 wherein said hinge box includes a hinge plate connected to a hinge bulkhead.

19. A forward facing rear door assembly as set forth in claim 18 wherein said hinge box includes a hinge bracket connected to another end of said hinge and said rear end of said forward facing rear door.

* * * * *